United States Patent
Guo

(10) Patent No.: US 11,480,769 B2
(45) Date of Patent: Oct. 25, 2022

(54) CAMERA OPTICAL LENS

(71) Applicant: AAC Optics Solutions Pte. Ltd., Singapore (SG)

(72) Inventor: Zhanli Guo, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 336 days.

(21) Appl. No.: 16/854,932

(22) Filed: Apr. 22, 2020

(65) Prior Publication Data

US 2021/0181477 A1 Jun. 17, 2021

(30) Foreign Application Priority Data

Dec. 13, 2019 (CN) .......................... 201911285709.X

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC ................................................ G02B 13/0045
See application file for complete search history.

(56) References Cited

U.S. PATENT DOCUMENTS

| 2020/0355891 | A1* | 11/2020 | Ye | G02B 27/0025 |
| 2021/0181473 | A1* | 6/2021 | Guo | G02B 13/0045 |
| 2021/0181476 | A1* | 6/2021 | Sun | G02B 9/64 |
| 2021/0181479 | A1* | 6/2021 | Lin | G02B 9/64 |
| 2021/0181482 | A1* | 6/2021 | Wang | G02B 13/06 |

* cited by examiner

*Primary Examiner* — Noam Reisner
(74) *Attorney, Agent, or Firm* — W&G Law Group

(57) ABSTRACT

Provided is a camera optical lens, which includes, from an object side to an image side: a first lens having a positive refractive power; a second lens having a negative refractive power; a third lens having a positive refractive power; a fourth lens having a positive refractive power; a fifth lens having a positive refractive power; a sixth lens having a negative refractive power; a seventh lens having a positive refractive power; and an eighth lens having a negative refractive power. The camera optical lens satisfies following conditions: $1.92 \leq f1/f \leq 3.20$; $f2 \leq 0.00$; and $1.55 \leq n4 \leq 1.70$, where f denotes a focal length of the camera optical lens; f1 denotes a focal length of the first lens; f2 denotes a focal length of the second lens; and n4 denotes a refractive index of the fourth lens. The present disclosure can achieve high optical performance while achieving ultra-thin, wide-angle lenses having a big aperture.

10 Claims, 7 Drawing Sheets

CAMERA OPTICAL LENS

TECHNICAL FIELD

The present disclosure relates to the field of optical lens, and more particularly, to a camera optical lens suitable for handheld terminal devices such as smart phones or digital cameras and camera devices such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become a mainstream in the market.

In order to obtain better imaging quality, the lens that is traditionally equipped in mobile phone cameras adopts a three-piece or four-piece lens structure, or even a five-piece or six-piece structure. Also, with the development of technology and the increase of the diverse demands of users, and as the pixel area of photosensitive devices is becoming smaller and smaller and the requirement of the system on the imaging quality is improving constantly, an eight-piece lens structure gradually appears in lens designs. Although the common eight-piece lens has good optical performance, its settings on refractive power, lens spacing and lens shape still have some irrationality, which results in that the lens structure cannot achieve a high optical performance while satisfying design requirements for ultra-thin, wide-angle lenses having a big aperture.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
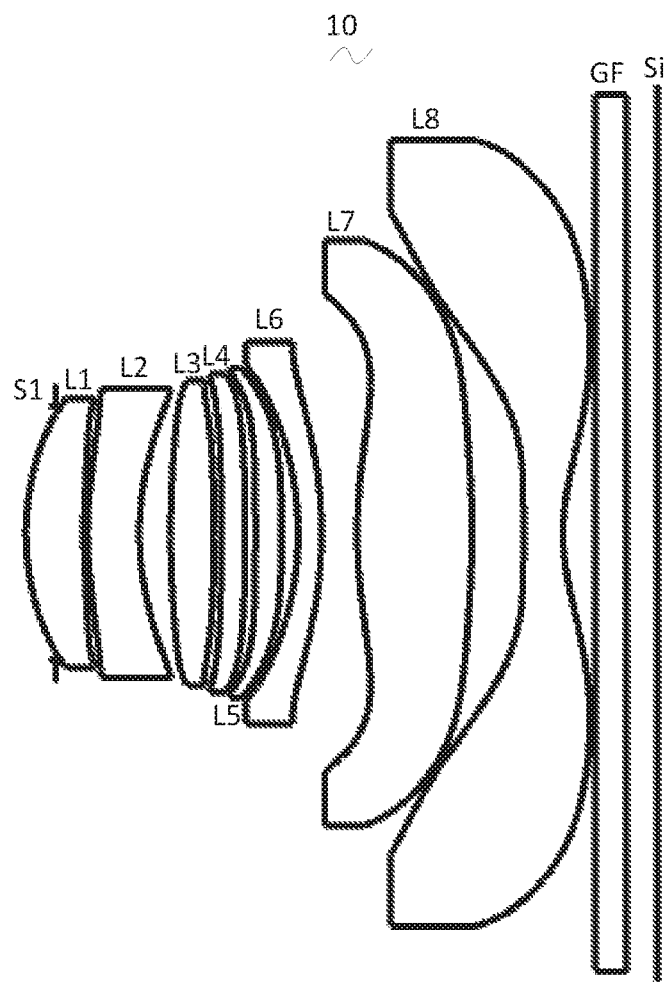
FIG. 1 is a schematic diagram of a structure of a camera optical lens in accordance with Embodiment 1 of the present disclosure.

Referring to FIG. 1, the present disclosure provides a camera optical lens 10. FIG. 1 shows the camera optical lens 10 according to Embodiment 1 of the present disclosure. The camera optical lens 10 includes 8 lenses. Specifically, the camera optical lens 10 includes, from an object side to an image side, an aperture S1, a first lens L1, a second lens L2, a third lens L3, a fourth lens L4, a fifth lens L5, a sixth lens L6, a seventh lens L7, and an eighth lens L8. An optical element such as a glass filter (GF) can be arranged between the eighth lens L8 and an image plane Si.

The first lens L1 has a positive refractive power, the second lens L2 has a negative refractive power, the third lens L3 has a positive refractive power, the fourth lens L4 has a positive refractive power, the fifth lens L5 has a positive refractive power, the sixth lens L6 has a negative refractive power, the seventh lens L7 has a positive refractive power, and the eighth lens L8 has a negative refractive power.

Here, a focal length of the camera optical lens 10 is defined as f, and a focal length of the first lens L1 is defined as f1. The camera optical lens 10 should satisfy a condition of $1.92 \le f1/f \le 3.20$. When the condition is satisfied, a spherical aberration and the field curvature of the system can be effectively balanced. As an example, $1.93 \le f1/f \le 3.197$.

A focal length of the second lens L2 is defined as f2, which satisfies a condition of $f2 \le 0.00$. This leads to the more appropriate distribution of the focal length, thereby achieving a better imaging quality and a lower sensitivity. As an example, $f2 \le -2.01$.

A refractive index of the fourth lens L4 is defined as n4, which satisfies a condition of $1.55 \le n4 \le 1.70$. This condition facilitates improving the optical performance of the system. As an example, $1.56 \le n4 \le 1.69$.

In this embodiment, with the above configurations of the lenses, the camera optical lens 10 can achieve high performance while satisfying design requirements for a low TTL, which is defined as a total optical length from an object side surface of the first lens to an image plane of the camera optical lens along an optic axis.

An on-axis distance from an image side surface of the sixth lens L6 to an object side surface of the seventh lens L7 is defined as d12, and an on-axis thickness of the seventh lens L7 is defined as d13. The camera optical lens 10 should satisfy a condition of $0.04 \le d12/d13 \le 0.35$. This facilitates reducing a total length of the optical system while achieving the ultra-thin effect. As an example, $0.04 \leq d12/d13 \leq 0.33$.

A curvature radius of an object side surface of the second lens L2 is defined as R3, and a curvature radius of an image side surface of the second lens L2 is defined as R4. The camera optical lens 10 should satisfy a condition of $2.00 \leq (R3+R4)/(R3-R4) \leq 23.00$, which specifies a shape of the second lens. This condition can alleviate the deflection of light passing through the lens while effectively reducing aberrations. As an example, $2.22 \leq (R3+R4)/(R3-R4) \leq 22.75$.

A curvature radius of the object side surface of the first lens L1 is defined as R1, and a curvature radius of an image side surface of the first lens L1 is defined as R2. The camera optical lens 10 should satisfy a condition of $-7.01 \leq (R1+R2)/(R1-R2) \leq -1.25$. This condition can reasonably control a shape of the first lens L1 in such a manner that the first lens L1 can effectively correct aberrations of the system. As an example, $-4.38 \leq (R1+R2)/(R1-R2) \leq -1.56$.

An on-axis thickness of the first lens L1 is defined as d1, and a total optical length from an object side surface of the first lens to an image plane of the camera optical lens along an optic axis is defined as TTL. The camera optical lens 10 should satisfy a condition of $0.04 \leq d1/TTL \leq 0.14$. This condition can facilitate achieving ultra-thin lenses. As an example, $0.06 \leq d1/TTL \leq 0.11$.

The focal length of the camera optical lens 10 is defined as f, and the focal length of the second lens L2 is defined as f2. The camera optical lens 10 should satisfy a condition of $-190.75 \leq f2/f \leq -1.88$. This condition can facilitate correction aberrations of the optical system by controlling a negative refractive power of the second lens L2 within a reasonable range. As an example, $-119.22 \leq f2/f \leq -2.34$.

An on-axis thickness of the second lens L2 is defined as d3. The camera optical lens 10 should satisfy a condition of $0.03 \leq d3/TTL \leq 0.13$. This condition can facilitate achieving ultra-thin lenses. As an example, $0.05 \leq d3/TTL \leq 0.10$.

The focal length of the camera optical lens 10 is defined as f, and the focal length of the third lens L3 is defined as f3. The camera optical lens 10 should satisfy a condition of $1.20 \leq f3/f \leq 6.98$. This condition can lead to the more appropriate distribution of the refractive power, thereby achieving a better imaging quality and a lower sensitivity. As an example, $1.92 \leq f3/f \leq 5.59$.

A curvature radius of an object side surface of the third lens L3 is defined as R5, and a curvature radius of an image side surface of the third lens L3 is defined as R6. The camera optical lens 10 should satisfy a condition of $-0.56 \leq (R5+R6)/(R5-R6) \leq -0.05$, which specifies a shape of the third lens. This condition can alleviate the deflection of light passing through the lens while effectively reducing aberrations. As an example, $-0.35 \leq (R5+R6)/(R5-R6) \leq -0.07$.

An on-axis thickness of the third lens L3 is defined as d5. The camera optical lens 10 should satisfy a condition of $0.03 \leq d5/TTL \leq 0.12$. This condition can facilitate achieving ultra-thin lenses. As an example, $0.05 \leq d5/TTL \leq 0.09$.

The focal length of the camera optical lens 10 is defined as f, and the focal length of the fourth lens L4 is defined as f4. The camera optical lens 10 should satisfy a condition of $0.59 \leq f4/f \leq 45.57$. This condition can lead to the more appropriate distribution of the refractive power, thereby achieving a better imaging quality and a lower sensitivity. As an example, $0.94 \leq f4/f \leq 36.46$.

A curvature radius of an object side surface of the fourth lens L4 is defined as R7, and a curvature radius of an image side surface of the fourth lens L4 is defined as R8. The camera optical lens 10 should satisfy a condition of $-1.63 \leq (R7+R8)/(R7-R8) \leq 9.23$, which specifies a shape of the fourth lens L4. This can facilitate correction of an off-axis aberration with development towards ultra-thin lenses. As an example, $-1.02 \leq (R7+R8)/(R7-R8) \leq 7.38$.

An on-axis thickness of the fourth lens L4 is defined as d7. The camera optical lens 10 should satisfy a condition of $0.02 \leq d7/TTL \leq 0.06$. This condition can facilitate achieving ultra-thin lenses. As an example, $0.03 \leq d7/TTL \leq 0.05$.

The focal length of the camera optical lens 10 is defined as f, and the focal length of the fifth lens L5 is defined as f5. The camera optical lens 10 should satisfy a condition of $3.95 \leq f5/f \leq 85.01$. This condition can effectively make a light angle of the camera lens gentle and reduce the tolerance sensitivity. As an example, $6.32 \leq f5/f \leq 68.01$.

A curvature radius of an object side surface of the fifth lens L5 is defined as R9, and a curvature radius of an image side surface of the fifth lens L5 is defined as R10. The camera optical lens 10 should satisfy a condition of $0.87 \leq (R9+R10)/(R9-R10) \leq 15.84$, which specifies a shape of the fifth lens L5. This can facilitate correction of an off-axis aberration with development towards ultra-thin lenses. As an example, $1.40 \leq (R9+R10)/(R9-R10) \leq 12.68$.

An on-axis thickness of the fifth lens L5 is defined as d9. The camera optical lens 10 should satisfy a condition of $0.01 \leq d9/TTL \leq 0.07$. This condition can facilitate achieving ultra-thin lenses. As an example, $0.02 \leq d9/TTL \leq 0.06$.

The focal length of the camera optical lens 10 is defined as f, and the focal length of the sixth lens L6 is defined as f6. The camera optical lens 10 should satisfy a condition of $-10.41 \leq f6/f \leq -2.06$. This condition can lead to the more appropriate distribution of the refractive power, thereby achieving a better imaging quality and a lower sensitivity. As an example, $-6.51 \leq f6/f \leq -2.58$.

A curvature radius of an object side surface of the sixth lens L6 is defined as R11, and a curvature radius of an image side surface of the sixth lens L6 is defined as R12. The camera optical lens 10 should satisfy a condition of $-11.31 \leq (R11+R12)/(R11-R12) \leq -1.79$, which specifies a shape of the sixth lens L6. This can facilitate correction of an off-axis aberration with development towards ultra-thin lenses. As an example, $-7.07 \leq (R11+R12)/(R11-R12) \leq -2.24$.

An on-axis thickness of the sixth lens L6 is defined as d11. The camera optical lens 10 should satisfy a condition of $0.02 \leq d11/TTL \leq 0.17$. This condition can facilitate achieving ultra-thin lenses. As an example, $0.03 \leq d11/TTL \leq 0.14$.

The focal length of the camera optical lens 10 is defined as f, and the focal length of the seventh lens L7 is defined as f7. The camera optical lens 10 should satisfy a condition of $0.57 \leq f7/f \leq 4.61$. This condition can lead to the more appropriate distribution of the refractive power, thereby achieving a better imaging quality and a lower sensitivity. As an example, $0.92 \leq f7/f \leq 3.69$.

A curvature radius of an object side surface of the seventh lens L7 is defined as R13, and a curvature radius of an image side surface of the seventh lens L7 is defined as R14. The camera optical lens 10 should satisfy a condition of $-1.72 \leq (R13+R14)/(R13-R14) \leq -0.21$, which specifies a shape of the seventh lens L7. This can facilitate correction of an off-axis aberration with development towards ultra-thin lenses. As an example, $-1.08 \leq (R13+R14)/(R13-R14) \leq -0.26$.

An on-axis thickness of the seventh lens L7 is defined as d13. The camera optical lens 10 should satisfy a condition of $0.05 \leq d13/TTL \leq 0.27$. This condition can facilitate achieving ultra-thin lenses. As an example, $0.09 \leq d13/TTL \leq 0.22$.

The focal length of the camera optical lens 10 is defined as f, and the focal length of the eighth lens L8 is defined as f8. The camera optical lens 10 should satisfy a condition of $-5.03 \leq f8/f \leq -0.54$. This condition can lead to the more appropriate distribution of the refractive power, thereby achieving a better imaging quality and a lower sensitivity. As an example, $-3.14 \leq f8/f \leq -0.67$.

A curvature radius of an object side surface of the eighth lens L8 is defined as R15, and a curvature radius of an image side surface of the eighth lens L8 is defined as R16. The camera optical lens 10 should satisfy a condition of $0.53 \leq (R15+R16)/(R15-R16) \leq 2.10$, which specifies a shape of the eighth lens L8. This can facilitate correction of an off-axis aberration with development towards ultra-thin lenses. As an example, $0.85 \leq (R15+R16)/(R15-R16) \leq 1.68$.

An on-axis thickness of the eighth lens L8 is defined as d15. The camera optical lens 10 should satisfy a condition of $0.02 \leq d15/TTL \leq 0.11$. This condition can facilitate achieving ultra-thin lenses. As an example, $0.04 \leq d15/TTL \leq 0.09$.

In this embodiment, an image height of the camera optical lens 10 is defined as IH. The camera optical lens 10 should satisfy a condition of $TTL/IH \leq 1.92$. This condition can facilitate achieving ultra-thin lenses.

In this embodiment, an F number of the camera optical lens 10 is defined as Fno. The camera optical lens 10 should satisfy $Fno \leq 1.91$, thereby leading to a big aperture.

When the focal length of the camera optical lens 10, the focal lengths of respective lenses, the refractive index of the seventh lens, the on-axis thicknesses of respective lenses, the TTL, and the curvature radius of object side surfaces and image side surfaces of respective lenses satisfy the above conditions, the camera optical lens 10 will have high optical performance while achieving ultra-thin, wide-angle lenses having a big aperture. The camera optical lens 10 is especially suitable for camera lens assembly of mobile phones and WEB camera lenses formed by CCD, CMOS and other imaging elements for high pixels.

With such design, the TTL of the camera optical lens 10 can be as small as possible, thereby maintaining the characteristic of miniaturization.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: Optical length (the total optical length from the object side surface of the first lens L1 to the image plane of the camera optical lens along the optic axis) in mm.

In an example, inflexion points and/or arrest points can be arranged on the object side surface and/or image side surface of the lens, so as to satisfy the demand for the high quality imaging. The description below can be referred to for specific implementations.

Table 1 and Table 2 show design data of the camera optical lens 10 according to Embodiment 1 of the present disclosure.

TABLE 1

|     | R       | d    |        | nd   |     | vd   |       |
| --- | ------- | ---- | ------ | ---- | --- | ---- | ----- |
| S1  | ∞       | d0=  | −0.200 |      |     |      |       |
| R1  | 1.717   | d1=  | 0.384  | nd1  |     | 1.5439 | v1 55.95 |
| R2  | 3.254   | d2=  | 0.024  |      |     |      |       |
| R3  | 1.950   | d3=  | 0.348  | nd2  |     | 1.6400 | v2 23.54 |
| R4  | 1.784   | d4=  | 0.208  |      |     |      |       |
| R5  | 6.431   | d5=  | 0.289  | nd3  |     | 1.5439 | v3 55.95 |
| R6  | −11.419 | d6=  | 0.051  |      |     |      |       |
| R7  | −21.369 | d7=  | 0.158  | nd4  |     | 1.5661 | v4 37.71 |
| R8  | −15.395 | d8=  | 0.068  |      |     |      |       |

TABLE 1-continued

|     | R       | d    |       | nd  |        | vd       |
| --- | ------- | ---- | ----- | --- | ------ | -------- |
| R9  | −36.456 | d9=  | 0.175 | nd5 | 1.5439 | v5 55.95 |
| R10 | −9.922  | d10= | 0.110 |     |        |          |
| R11 | −2.116  | d11= | 0.156 | nd6 | 1.6400 | v6 23.54 |
| R12 | −3.025  | d12= | 0.240 |     |        |          |
| R13 | 2.908   | d13= | 0.764 | nd7 | 1.5439 | v7 55.95 |
| R14 | −5.578  | d14= | 0.345 |     |        |          |
| R15 | 46.705  | d15= | 0.264 | nd8 | 1.5346 | v8 55.69 |
| R16 | 1.326   | d16= | 0.212 |     |        |          |
| R17 | ∞       | d17= | 0.210 | ndg | 1.5170 | vg 64.20 |
| R18 | ∞       | d18= | 0.206 |     |        |          |

In the table, meanings of various symbols will be described as follows.

S1: aperture;

R: curvature radius of an optical surface, a central curvature radius for a lens;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the sixth lens L6;

R12: curvature radius of the image side surface of the sixth lens L6;

R13: curvature radius of the object side surface of the seventh lens L7;

R14: curvature radius of the image side surface of the seventh lens L7;

R15: curvature radius of the object side surface of the eighth lens L8;

R16: curvature radius of the image side surface of the eighth lens L8;

R17: curvature radius of an object side surface of the optical filter GF;

R18: curvature radius of an image side surface of the optical filter GF;

d: on-axis thickness of a lens and an on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the sixth lens L6;

d11: on-axis thickness of the sixth lens L6;

d12: on-axis distance from the image side surface of the sixth lens L6 to the object side surface of the seventh lens L7;

d13: on-axis thickness of the seventh lens L7;

d14: on-axis distance from the image side surface of the seventh lens L7 to the object side surface of the eighth lens L8;

d15: on-axis thickness of the eighth lens L8;

d16: on-axis distance from the image side surface of the eighth lens L8 to the object side surface of the optical filter GF;

d17: on-axis thickness of the optical filter GF;

d18: on-axis distance from the image side surface of the optical filter GF to the image plane;

nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
nd8: refractive index of d line of the eighth lens L8;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the eighth lens L8;
vg: abbe number of the optical filter GF.

Table 2 shows aspheric surface data of respective lens in the camera optical lens 10 according to Embodiment 1 of the present disclosure.

In Table 2, k is a conic coefficient, and A4, A6, A8, A10, A12, A14, and A16 are aspheric surface coefficients.

IH: Image Height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (1)$$

In the present embodiment, an aspheric surface of each lens surface uses the aspheric surfaces shown in the above condition (1). However, the present disclosure is not limited to the aspherical polynomials form shown in the condition (1).

Table 3 and Table 4 show design data of inflexion points and arrest points of respective lens in the camera optical lens 10 according to Embodiment 1 of the present disclosure. P1R1 and P1R2 represent the object side surface and the image side surface of the first lens L1, respectively, P2R1 and P2R2 represent the object side surface and the image side surface of the second lens L2, respectively, P3R1 and P3R2 represent the object side surface and the image side surface of the third lens L3, respectively, P4R1 and P4R2 represent the object side surface and the image side surface of the fourth lens L4, respectively, P5R1 and P5R2 represent the object side surface and the image side surface of the fifth lens L5, respectively, P6R1 and P6R2 represent the object side surface and the image side surface of the sixth lens L6, respectively, P7R1 and P7R2 represent the object side surface and the image side surface of the seventh lens L7, respectively, and P8R1 and P8R2 represent the object side surface and the image side surface of the eighth lens L8, respectively. The data in the column named "inflexion point position" refers to vertical distances from inflexion points arranged on each lens surface to the optic axis of the camera optical lens 10. The data in the column named "arrest point position" refers to vertical distances from arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 0 | | | |
| P1R2 | 2 | 0.315 | 0.415 | |

TABLE 2

| | Conic coefficient | Aspherical surface coefficients | | | | | | |
|---|---|---|---|---|---|---|---|---|
| | k | A4 | A6 | A8 | A10 | A12 | A14 | A16 |
| R1 | 7.6732E−02 | 5.0124E−03 | 1.2612E−02 | 2.9449E−02 | −4.1630E−02 | 7.2610E−02 | −5.8502E−02 | 6.5080E−02 |
| R2 | −1.3323E+02 | −1.7673E−01 | 4.5108E−01 | −3.7090E−01 | 3.6202E−01 | −4.3758E−01 | −2.5334E−01 | 6.7087E−01 |
| R3 | −3.2307E+01 | −1.3823E−01 | 3.6790E−01 | −4.8130E−01 | 4.6492E−01 | −2.6979E−01 | −4.6523E−01 | 5.7140E−01 |
| R4 | −1.1634E+01 | 1.3411E−01 | −2.3517E−01 | 4.7884E−01 | −5.8440E−01 | 3.1738E−01 | −2.6658E−02 | −4.0240E−02 |
| R5 | −1.2228E+01 | −3.4063E−03 | −3.7275E−03 | 1.1664E−02 | −3.7523E−02 | 5.5405E−02 | 7.6007E−02 | −6.3203E−02 |
| R6 | 1.1296E+02 | −4.8457E−03 | −3.3308E−02 | 1.4273E−03 | −1.5155E−03 | −1.0607E−02 | −6.7469E−03 | 6.0096E−02 |
| R7 | 4.3423E+02 | −3.2026E−02 | 1.0666E−02 | −9.6027E−03 | −6.3972E−03 | 3.3356E−03 | 8.1947E−03 | −5.8170E−03 |
| R8 | 5.5271E+01 | −2.0813E−02 | −3.6372E−02 | −1.4288E−01 | −4.1850E−01 | −1.1159E−01 | −2.8532E−03 | 6.7118E−05 |
| R9 | 1.1447E+03 | −5.9513E−02 | −3.1455E−02 | −2.3466E−02 | 4.4388E−03 | 1.0877E−03 | 4.7242E−04 | −8.4964E−04 |
| R10 | 6.7901E+01 | −1.7538E−01 | 1.1455E−01 | −1.0701E−01 | −1.1694E−01 | 3.0803E−01 | −2.0752E−01 | 4.5363E−02 |
| R11 | 1.1860E+00 | −4.5472E−02 | 2.3191E−01 | −4.2921E−01 | 3.9873E−01 | −1.7441E−01 | 2.2992E−02 | −1.0882E−03 |
| R12 | −1.7143E+01 | −1.4871E−01 | 2.6588E−01 | −3.0280E−01 | 2.1805E−01 | −8.0312E−02 | 1.1906E−02 | 1.7897E−04 |
| R13 | −1.7044E+01 | −4.2712E−02 | 5.2091E−02 | −8.7170E−02 | 5.2159E−02 | −1.7321E−02 | 2.6097E−03 | −5.4587E−05 |
| R14 | −8.6067E+01 | 3.0340E−03 | 1.0022E−02 | −2.6892E−02 | 1.1151E−02 | −1.7264E−03 | 8.0044E−05 | −3.9441E−06 |
| R15 | 3.3994E+02 | −3.4403E−01 | 1.8795E−01 | −5.8711E−02 | 1.3497E−02 | −2.2780E−03 | 2.3159E−04 | −1.0021E−05 |
| R16 | −3.4462E+00 | −2.3369E−01 | 1.6113E−01 | −7.5278E−02 | 2.2776E−02 | −4.1773E−03 | 4.1478E−04 | −1.7017E−05 |

TABLE 3-continued

| | Number of inflexion points | Inflexion point position 1 | Inflexion point position 2 | Inflexion point position 3 |
|---|---|---|---|---|
| P2R1 | 2 | 0.655 | 0.825 | |
| P2R2 | 1 | 0.845 | | |
| P3R1 | 0 | | | |
| P3R2 | 1 | 0.845 | | |
| P4R1 | 0 | | | |
| P4R2 | 0 | | | |
| P5R1 | 0 | | | |
| P5R2 | 0 | | | |
| P6R1 | 0 | | | |
| P6R2 | 1 | 0.875 | | |
| P7R1 | 1 | 0.615 | | |
| P7R2 | 0 | | | |
| P8R1 | 3 | 0.075 | 1.325 | 1.905 |
| P8R2 | 1 | 0.515 | | |

TABLE 4

| | Number of arrest points | Arrest point position 1 |
|---|---|---|
| P1R1 | 0 | |
| P1R2 | 0 | |
| P2R1 | 0 | |
| P2R2 | 0 | |
| P3R1 | 0 | |
| P3R2 | 1 | 0.955 |
| P4R1 | 0 | |
| P4R2 | 0 | |
| P5R1 | 0 | |
| P5R2 | 0 | |
| P6R1 | 0 | |
| P6R2 | 1 | 1.215 |
| P7R1 | 1 | 0.995 |
| P7R2 | 0 | |
| P8R1 | 1 | 0.125 |
| P8R2 | 1 | 1.235 |

Figure 2:
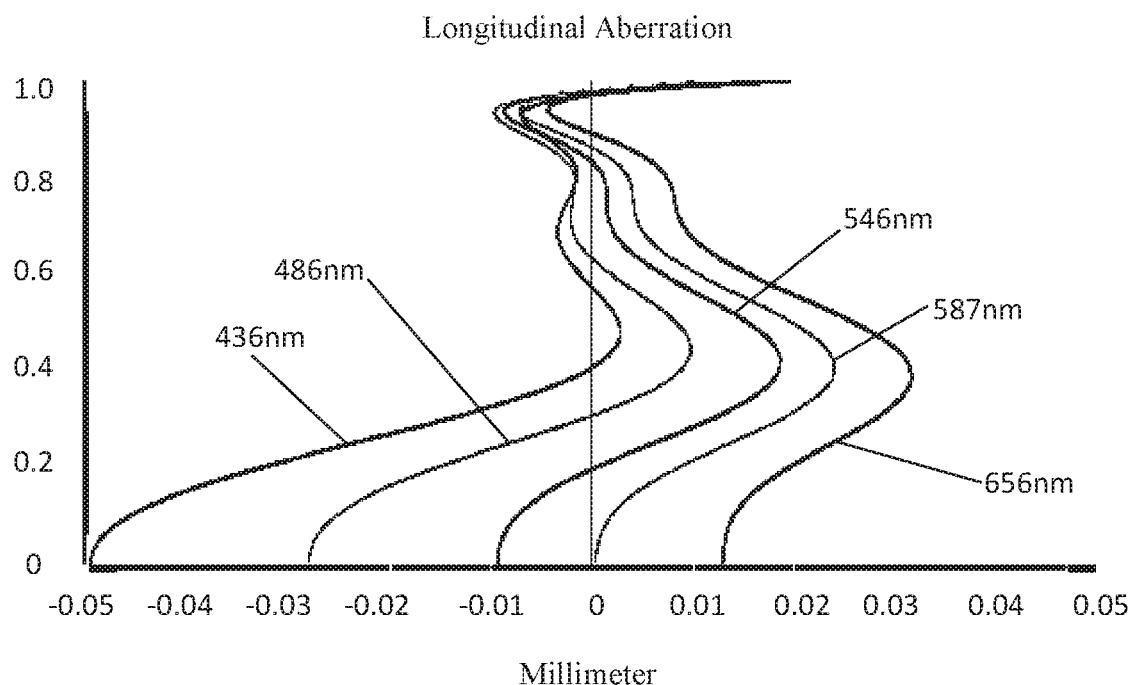
FIG. 2 is a schematic diagram of a longitudinal aberration of the camera optical lens shown in FIG. 1.
Figure 3:
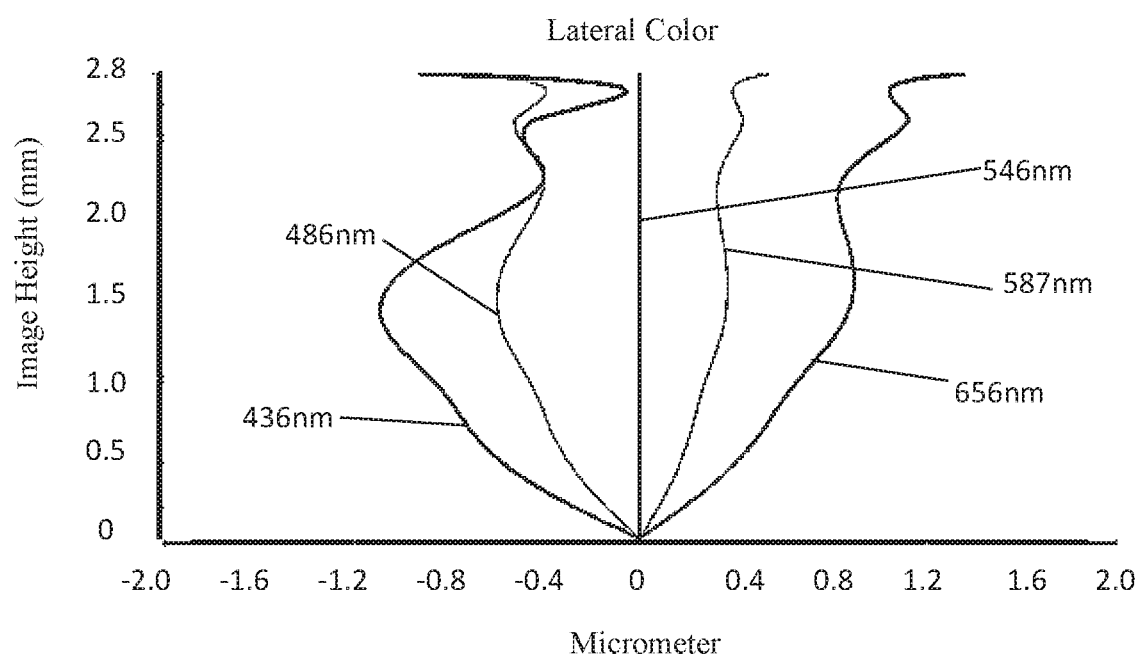
FIG. 3 is a schematic diagram of a lateral color of the camera optical lens shown in FIG. 1.
Figure 4:
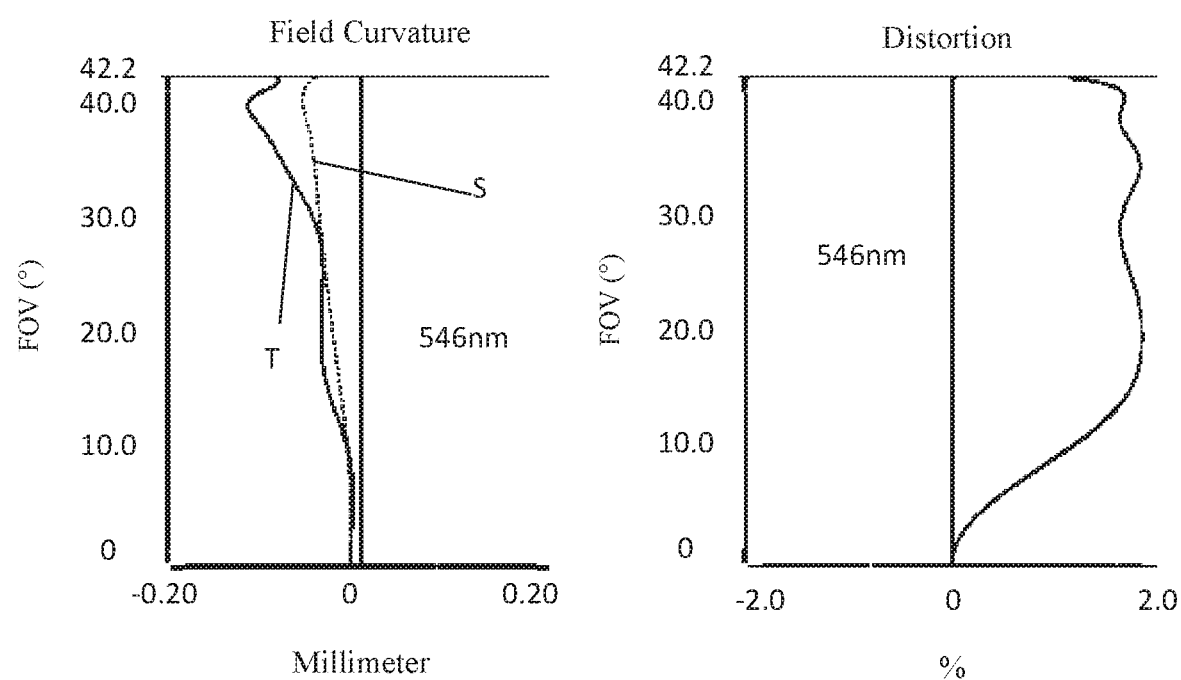
FIG. 4 is a schematic diagram of a field curvature and a distortion of the camera optical lens shown in FIG. 1.
Figure 5:
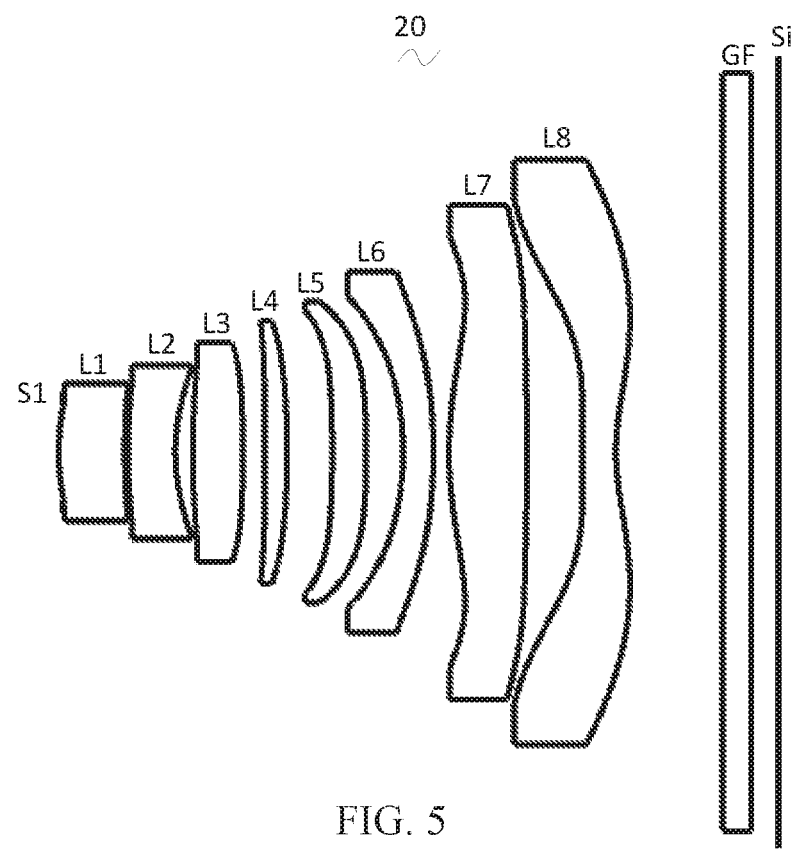
FIG. 5 is a schematic diagram of a structure of a camera optical lens in accordance with Embodiment 2 of the present disclosure.

FIG. 2 and FIG. 3 illustrate a longitudinal aberration and a lateral color of light with wavelengths of 656 nm, 587 nm, 546 nm, 486 nm and 436 nm after passing the camera optical lens 10 according to Embodiment 1. FIG. 4 illustrates a field curvature and a distortion of light with a wavelength of 546 nm after passing the camera optical lens 10 according to Embodiment 1, in which a field curvature S is a field curvature in a sagittal direction and T is a field curvature in a tangential direction.

Table 13 below further lists various values of Embodiments 1, 2, and 3 and values corresponding to parameters which are specified in the above conditions.

As shown in Table 13, Embodiment 1 satisfies respective conditions.

In this embodiment, the entrance pupil diameter of the camera optical lens is 1.659 mm. The image height of 1.0H is 2.90 mm. The FOV (field of view) is 84.40°. Thus, the camera optical lens can achieve ultra-thin, wide-angle lenses while having on-axis and off-axis aberrations sufficiently corrected, thereby leading to better optical characteristics.

Embodiment 2

Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

| | R | d | nd | | vd | |
|---|---|---|---|---|---|---|
| S1 | ∞ | d0= −0.030 | | | | |
| R1 | 1.697 | d1= 0.493 | nd1 | 1.5439 | v1 | 55.95 |
| R2 | 5.590 | d2= 0.025 | | | | |
| R3 | 3.345 | d3= 0.357 | nd2 | 1.6400 | v2 | 23.54 |
| R4 | 1.402 | d4= 0.133 | | | | |
| R5 | 5.962 | d5= 0.377 | nd3 | 1.5439 | v3 | 55.95 |
| R6 | −9.120 | d6= 0.160 | | | | |
| R7 | 1.371 | d7= 0.172 | nd4 | 1.6700 | v4 | 19.39 |
| R8 | −6.519 | d8= 0.339 | | | | |
| R9 | −11.295 | d9= 0.254 | nd5 | 1.5439 | v5 | 55.95 |
| R10 | −9.071 | d10= 0.276 | | | | |
| R11 | −2.149 | d11= 0.227 | nd6 | 1.6400 | v6 | 23.54 |
| R12 | −4.042 | d12= 0.118 | | | | |
| R13 | 2.514 | d13= 0.587 | nd7 | 1.5439 | v7 | 55.95 |
| R14 | −13.117 | d14= 0.414 | | | | |
| R15 | 10.136 | d15= 0.252 | nd8 | 1.5346 | v8 | 55.69 |
| R16 | 1.608 | d16= 0.804 | | | | |
| R17 | ∞ | d17= 0.210 | ndg | 1.5170 | vg | 64.20 |
| R18 | ∞ | d18= 0.206 | | | | |

Table 6 shows aspheric surface data of respective lenses in the camera optical lens 20 according to Embodiment 2 of the present disclosure.

TABLE 6

| | Conic coefficient | Aspherical surface coefficients | | | | | | |
|---|---|---|---|---|---|---|---|---|
| | k | A4 | A6 | A8 | A10 | A12 | A14 | A16 |
| R1 | 9.6297E−01 | 2.7079E−02 | −5.0083E−03 | 2.9603E−02 | 4.8505E−01 | 4.0338E+00 | 8.2588E+00 | −1.7227E+02 |
| R2 | −3.5708E+01 | −8.2240E−02 | 8.5700E−01 | −1.9548E−01 | 1.7579E+00 | 1.4229E+00 | −1.9089E+01 | −1.4912E+02 |
| R3 | −6.9593E+01 | −8.7210E−02 | 3.5371E−01 | −1.0454E−01 | 1.9099E+00 | 4.3499E+00 | 2.3642E+00 | −1.9309E+02 |
| R4 | −7.2088E+00 | 1.3990E−01 | −2.0092E−01 | 5.2147E−01 | −6.4730E−01 | 4.0248E−01 | −2.3776E−01 | −2.1999E+00 |
| R5 | −3.1174E−01 | −1.9611E−02 | −6.7386E−03 | 3.8727E−02 | −4.3789E−02 | 4.1428E−02 | −1.2049E−01 | −6.3972E−01 |
| R6 | 1.0620E+02 | −5.4201E−02 | −3.9466E−02 | −7.8800E−03 | −5.0159E−03 | −3.1451E−03 | −3.2659E−03 | 4.9092E−02 |
| R7 | −3.0908E−02 | −3.0810E−03 | −1.3625E−02 | −1.9308E−03 | 8.0317E−03 | 7.2103E−03 | 4.4481E−03 | 0.0000E+00 |
| R8 | 2.6402E+01 | −1.6681E−02 | −1.7755E−02 | 1.1471E−03 | 1.7705E−03 | −3.6468E−03 | −6.6641E−03 | 3.4419E−03 |
| R9 | 1.1531E+02 | −6.2206E−02 | −3.9771E−02 | −2.4671E−02 | 1.1732E−02 | 1.0369E−02 | 8.8322E−03 | −8.4572E−03 |
| R10 | 6.5274E+01 | −1.7328E−01 | 8.6852E−02 | −1.1551E−01 | −8.8177E−02 | 3.0415E−01 | −2.2518E−01 | 5.3465E−02 |
| R11 | 2.1048E+00 | −5.5815E−02 | 2.1650E−01 | −4.2943E−01 | 4.2353E−01 | −1.7753E−01 | 2.6735E−02 | −1.3174E−03 |
| R12 | −2.7031E+01 | −1.3211E−01 | 2.0341E−01 | −2.7479E−01 | 2.0771E−01 | −7.7652E−02 | 1.2009E−02 | −2.1440E−04 |
| R13 | −1.5797E+01 | −1.8420E−02 | 4.4084E−02 | −8.5732E−02 | 5.0842E−02 | −1.5374E−02 | 2.5858E−03 | −1.8455E−04 |
| R14 | −3.8423E+02 | 7.8171E−03 | 1.3353E−02 | −2.3837E−02 | 1.0151E−02 | −1.6942E−03 | 8.2823E−05 | 2.8345E−06 |
| R15 | 1.3749E+01 | −3.1556E−01 | 1.7657E−01 | −5.7470E−02 | 1.3717E−02 | −2.3441E−03 | 2.4070E−04 | −1.0768E−05 |
| R16 | −6.0612E+00 | −2.2055E−01 | 1.5236E−01 | −7.3177E−02 | 2.2545E−02 | −4.1413E−03 | 4.0816E−04 | −1.6421E−05 |

Table 7 and Table 8 show design data of inflexion points and arrest points of respective lens in the camera optical lens 20 according to Embodiment 2 of the present disclosure.

TABLE 7

|  | Number of inflexion points | Inflexion point position 1 | Inflexion point position 2 |
|---|---|---|---|
| P1R1 | 0 | | |
| P1R2 | 1 | 0.485 | |
| P2R1 | 1 | 0.465 | |
| P2R2 | 1 | 0.625 | |
| P3R1 | 1 | 0.595 | |
| P3R2 | 0 | | |
| P4R1 | 1 | 0.885 | |
| P4R2 | 0 | | |
| P5R1 | 0 | | |
| P5R2 | 0 | | |
| P6R1 | 0 | | |
| P6R2 | 1 | 1.165 | |
| P7R1 | 2 | 0.695 | 1.515 |
| P7R2 | 2 | 0.555 | 0.745 |
| P8R1 | 2 | 0.165 | 1.275 |
| P8R2 | 2 | 0.455 | 2.105 |

TABLE 8

|  | Number of arrest points | Arrest point position 1 |
|---|---|---|
| P1R1 | 0 | |
| P1R2 | 0 | |
| P2R1 | 0 | |
| P2R2 | 0 | |
| P3R1 | 0 | |
| P3R2 | 0 | |
| P4R1 | 0 | |
| P4R2 | 0 | |
| P5R1 | 0 | |
| P5R2 | 0 | |
| P6R1 | 0 | |
| P6R2 | 0 | |
| P7R1 | 1 | 1.095 |
| P7R2 | 0 | |
| P8R1 | 1 | 0.295 |
| P8R2 | 1 | 0.975 |

Figure 6:
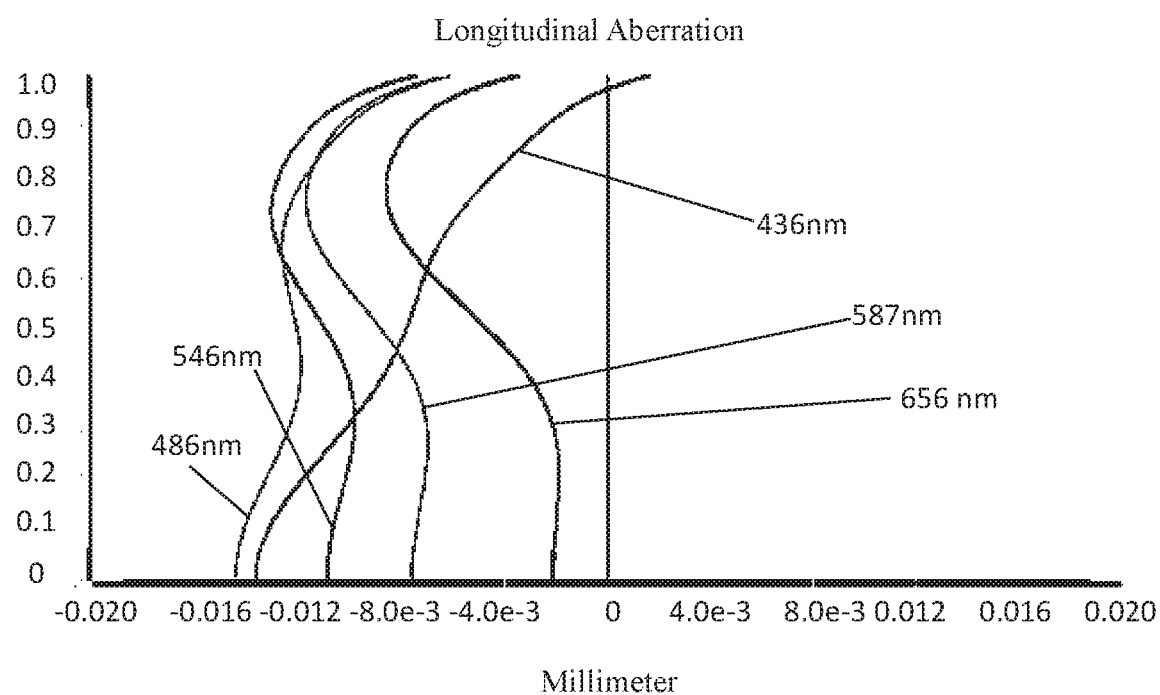
FIG. 6 is a schematic diagram of a longitudinal aberration of the camera optical lens shown in FIG. 5.
Figure 7:
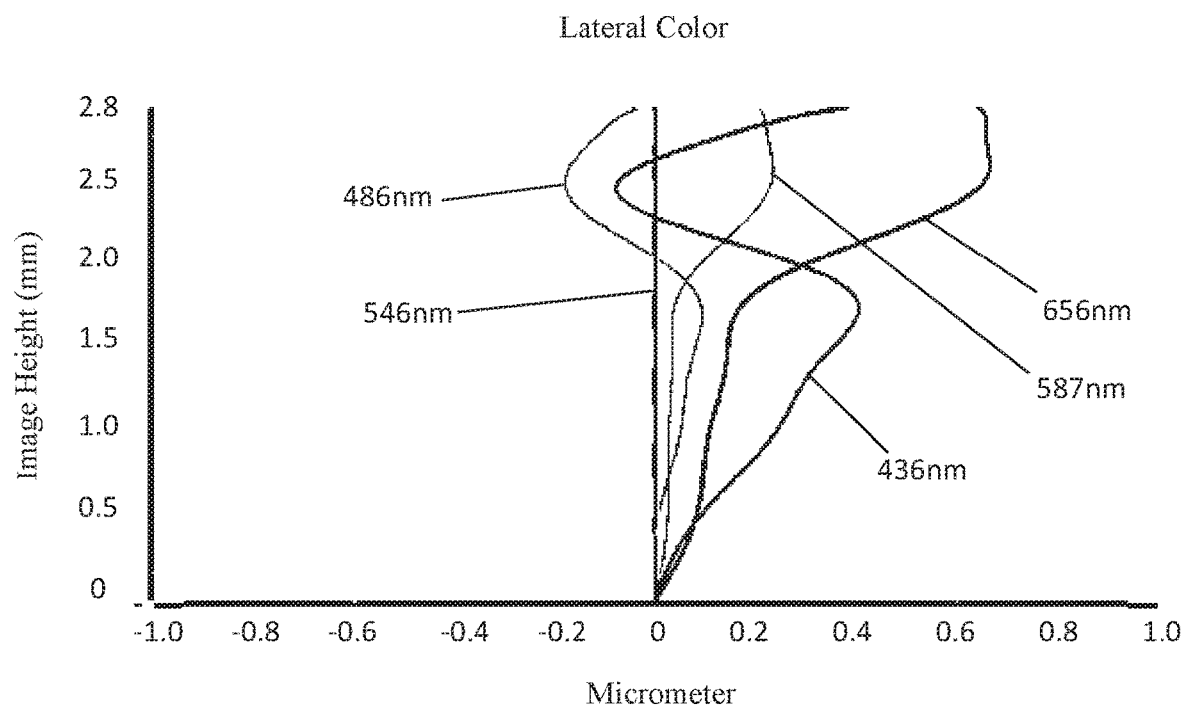
FIG. 7 is a schematic diagram of a lateral color of the camera optical lens shown in FIG. 5.
Figure 8:
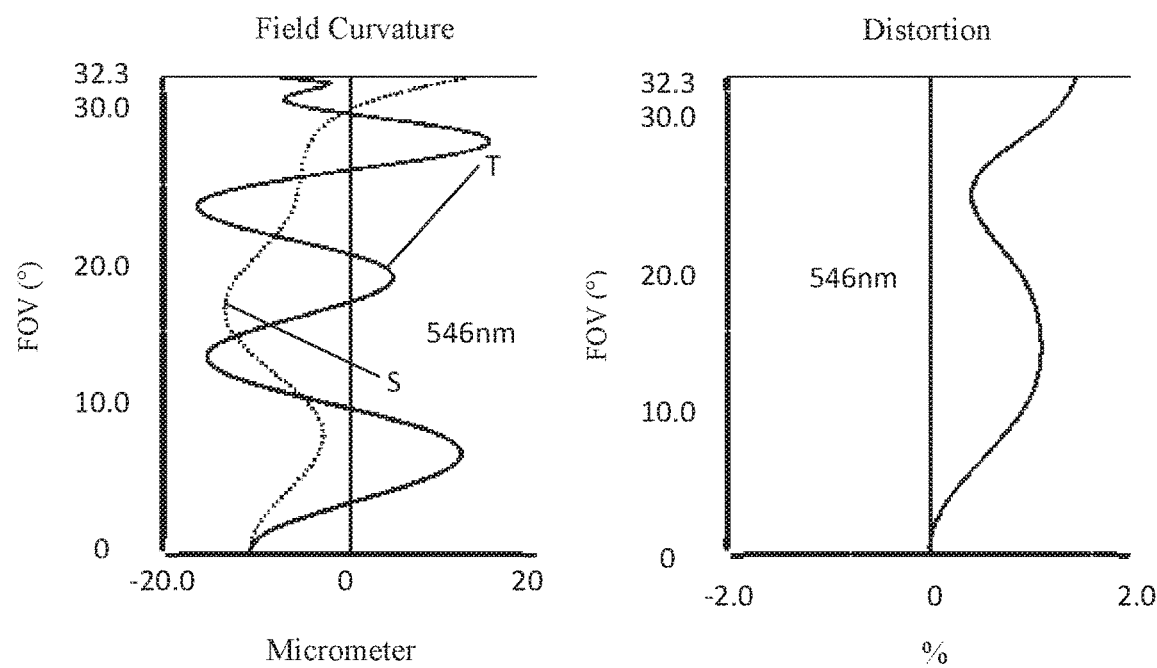
FIG. 8 is a schematic diagram of a field curvature and a distortion of the camera optical lens shown in FIG. 5.
Figure 9:
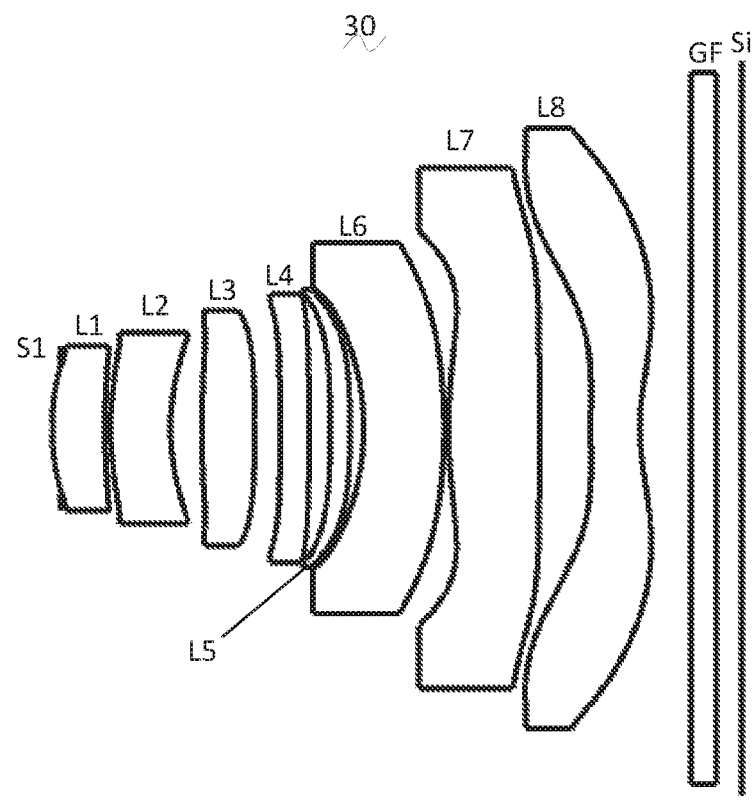
FIG. 9 is a schematic diagram of a structure of a camera optical lens in accordance with Embodiment 3 of the present disclosure.

FIG. 6 and FIG. 7 illustrate a longitudinal aberration and a lateral color of light with wavelengths of 656 nm, 587 nm, 546 nm, 486 nm and 436 nm after passing the camera optical lens 20 according to Embodiment 2. FIG. 8 illustrates a field curvature and a distortion of light with a wavelength of 546 nm after passing the camera optical lens 20 according to Embodiment 2.

As shown in Table 13, Embodiment 2 satisfies respective conditions.

In this embodiment, the entrance pupil diameter of the camera optical lens is 0.753 mm. The image height of 1.0H is 2.90 mm. The FOV (field of view) is 64.52°. Thus, the camera optical lens can achieve ultra-thin, wide-angle lenses while having on-axis and off-axis aberrations sufficiently corrected, thereby leading to better optical characteristics.

Embodiment 3

Embodiment 3 is basically the same as Embodiment 1 and involves symbols having the same meanings as Embodiment 1, and only differences therebetween will be described in the following.

Table 9 and Table 10 show design data of a camera optical lens 30 in Embodiment 3 of the present disclosure.

TABLE 9

|  | R | d | | nd | | vd | |
|---|---|---|---|---|---|---|---|
| S1 | ∞ | d0= | −0.070 | | | | |
| R1 | 1.794 | d1= | 0.425 | nd1 | 1.5439 | v1 | 55.95 |
| R2 | 3.226 | d2= | 0.046 | | | | |
| R3 | 1.889 | d3= | 0.483 | nd2 | 1.6400 | v2 | 23.54 |
| R4 | 1.675 | d4= | 0.254 | | | | |
| R5 | 8.327 | d5= | 0.427 | nd3 | 1.5439 | v3 | 55.95 |
| R6 | −9.758 | d6= | 0.200 | | | | |
| R7 | 2.188 | d7= | 0.237 | nd4 | 1.6700 | v4 | 19.39 |
| R8 | −21.408 | d8= | 0.168 | | | | |
| R9 | −11.274 | d9= | 0.160 | nd5 | 1.5439 | v5 | 55.95 |
| R10 | −9.324 | d10= | 0.110 | | | | |
| R11 | −2.034 | d11= | 0.647 | nd6 | 1.6400 | v6 | 23.54 |
| R12 | −4.443 | d12= | 0.036 | | | | |
| R13 | 3.764 | d13= | 0.733 | nd7 | 1.5439 | v7 | 55.95 |
| R14 | −50.334 | d14= | 0.413 | | | | |
| R15 | 9.948 | d15= | 0.396 | nd8 | 1.5346 | v8 | 55.69 |
| R16 | 1.657 | d16= | 0.410 | | | | |
| R15 | ∞ | d15= | 0.210 | ndg | 1.5170 | vg | 64.20 |
| R16 | ∞ | d16= | 0.206 | | | | |

Table 10 shows aspheric surface data of respective lenses in the camera optical lens 30 according to Embodiment 3 of the present disclosure.

TABLE 10

| | Conic coefficient | Aspherical surface coefficients | | | | | | |
|---|---|---|---|---|---|---|---|---|
| | k | A4 | A6 | A8 | A10 | A12 | A14 | A16 |
| R1 | 1.0245E−01 | −1.3804E−03 | 5.7510E−02 | 9.6304E−02 | −1.0515E−01 | −4.0930E−01 | −9.1724E−01 | 4.4166E+00 |
| R2 | −1.8105E+02 | −1.6562E−01 | 6.5959E−01 | −6.4402E−01 | 4.3165E−01 | 7.1649E−01 | −4.0895E+00 | 4.3769E+00 |
| R3 | −3.9452E+01 | −5.0402E−02 | 2.9189E−01 | −4.4351E−01 | 4.3770E−01 | 1.3331E−01 | 8.0948E−01 | −3.6739E+00 |
| R4 | −9.9238E+00 | 1.2433E−01 | −2.1007E−01 | 5.3598E−01 | −7.1284E−01 | 1.6180E−01 | −3.1084E−01 | 5.2205E−01 |
| R5 | 3.1299E+01 | −3.5006E−03 | −1.0393E−02 | 8.2202E−03 | −8.7597E−02 | 2.3288E−02 | −2.5467E−02 | −3.4629E−01 |
| R6 | 1.0648E+02 | −3.7555E−02 | −2.8198E−02 | 1.1673E−03 | −3.7919E−03 | −1.4497E−02 | −3.2942E−02 | −1.8467E−03 |
| R7 | −5.7296E−02 | −1.4222E−02 | −1.9615E−02 | −5.0760E−03 | 7.0911E−03 | 6.9474E−03 | 3.3236E−03 | 0.0000E+00 |
| R8 | 4.7095E+01 | −2.5960E−03 | −1.4505E−02 | 2.0516E−03 | 2.5224E−03 | −3.5257E−03 | −7.5167E−03 | 1.2748E−03 |
| R9 | 1.1044E+02 | −6.9624E−03 | −3.7077E−02 | −1.6470E−02 | 1.8008E−02 | 1.2184E−02 | 7.4266E−03 | −1.1823E−02 |
| R10 | 7.0613E+01 | −1.7489E−01 | 9.2794E−02 | −1.1659E−01 | −9.0168E−02 | 3.0435E−01 | −2.2269E−01 | 5.7544E−02 |
| R11 | 2.0760E+00 | −3.3605E−02 | 2.2509E−01 | −4.2148E−01 | 4.2718E−01 | −1.7866E−01 | 2.3321E−02 | −6.8769E−03 |
| R12 | −9.3419E+01 | −1.3953E−01 | 2.0071E−01 | −2.7572E−01 | 2.0747E−01 | −7.7685E−02 | 1.1992E−02 | −2.4123E−04 |
| R13 | −9.7918E+00 | −4.2735E−02 | 3.7004E−02 | −8.6080E−02 | 5.0991E−02 | −1.5329E−02 | 2.5857E−03 | −1.8775E−04 |
| R14 | 8.3522E+01 | 9.9801E−04 | 1.3363E−02 | −2.3743E−02 | 1.0176E−02 | −1.6900E−03 | 8.3020E−05 | 2.8051E−06 |
| R15 | 1.3470E+01 | −3.1576E−01 | 1.7656E−01 | −5.7472E−02 | 1.3717E−02 | −2.3427E−03 | 2.4097E−04 | −1.0724E−05 |
| R16 | −7.0835E+00 | −2.2304E−01 | 1.5218E−01 | −7.3206E−02 | 2.2541E−02 | −4.1418E−03 | 4.0809E−04 | −1.6436E−05 |

Table 11 and Table 12 show design data of inflexion points and arrest points of respective lens in the camera optical lens 30 according to Embodiment 3 of the present disclosure.

TABLE 11

|  | Number of inflexion points | Inflexion point position 1 | Inflexion point position 2 |
|---|---|---|---|
| P1R1 | 0 | | |
| P1R2 | 0 | | |
| P2R1 | 1 | 0.635 | |
| P2R2 | 1 | 0.685 | |
| P3R1 | 1 | 0.575 | |
| P3R2 | 0 | | |
| P4R1 | 1 | 0.985 | |
| P4R2 | 0 | | |
| P5R1 | 0 | | |
| P5R2 | 0 | | |
| P6R1 | 0 | | |
| P6R2 | 1 | 1.415 | |
| P7R1 | 1 | 0.605 | |
| P7R2 | 1 | 1.655 | |
| P8R1 | 2 | 0.175 | 1.275 |
| P8R2 | 2 | 0.435 | 2.235 |

TABLE 12

|  | Number of arrest points | Arrest point position 1 | Arrest point position 2 |
|---|---|---|---|
| P1R1 | 0 | | |
| P1R2 | 0 | | |
| P2R1 | 0 | | |
| P2R2 | 0 | | |
| P3R1 | 1 | 0.725 | |
| P3R2 | 0 | | |
| P4R1 | 0 | | |
| P4R2 | 0 | | |
| P5R1 | 0 | | |
| P5R2 | 0 | | |
| P6R1 | 0 | | |
| P6R2 | 0 | | |
| P7R1 | 1 | 0.925 | |
| P7R2 | 0 | | |
| P8R1 | 2 | 0.295 | 2.085 |
| P8R2 | 1 | 0.915 | |

Figure 10:
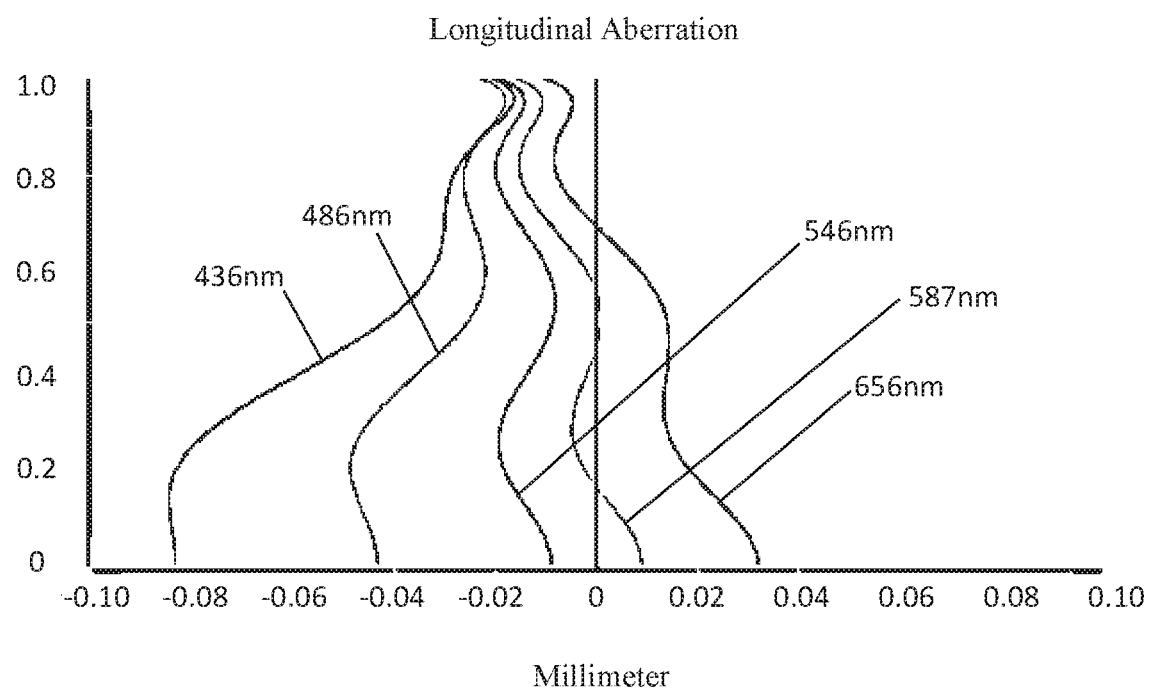
FIG. 10 is a schematic diagram of a longitudinal aberration of the camera optical lens shown in FIG. 9.
Figure 11:
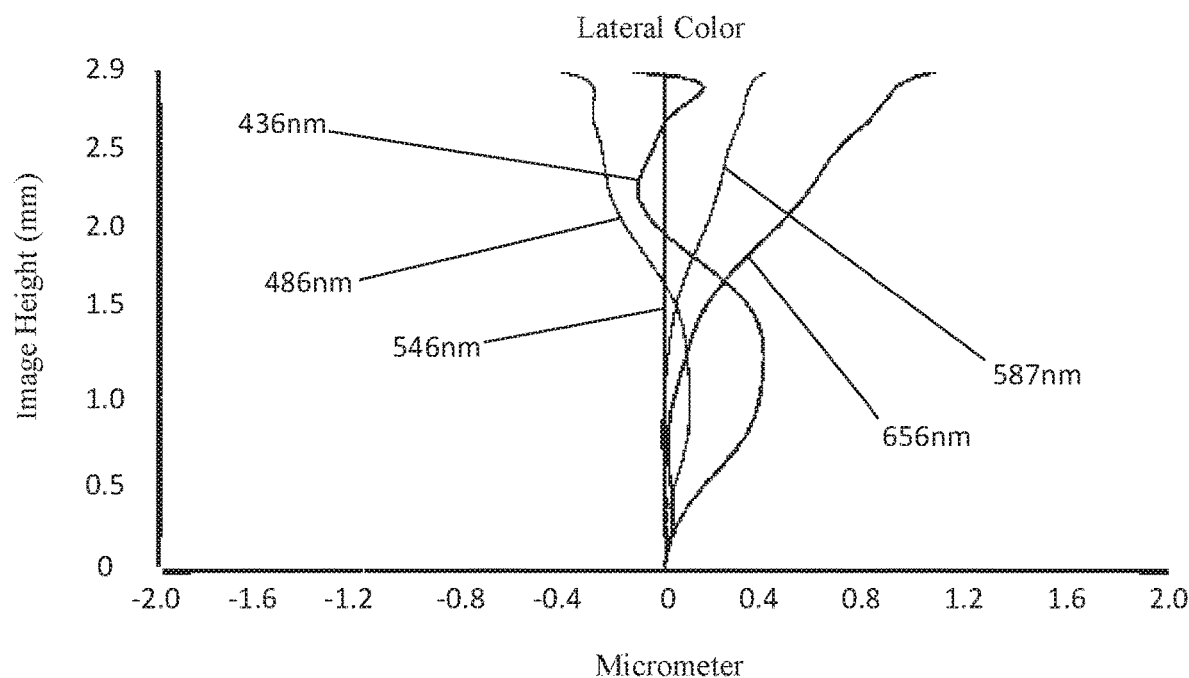
FIG. 11 is a schematic diagram of a lateral color of the camera optical lens shown in FIG. 9.
Figure 12:
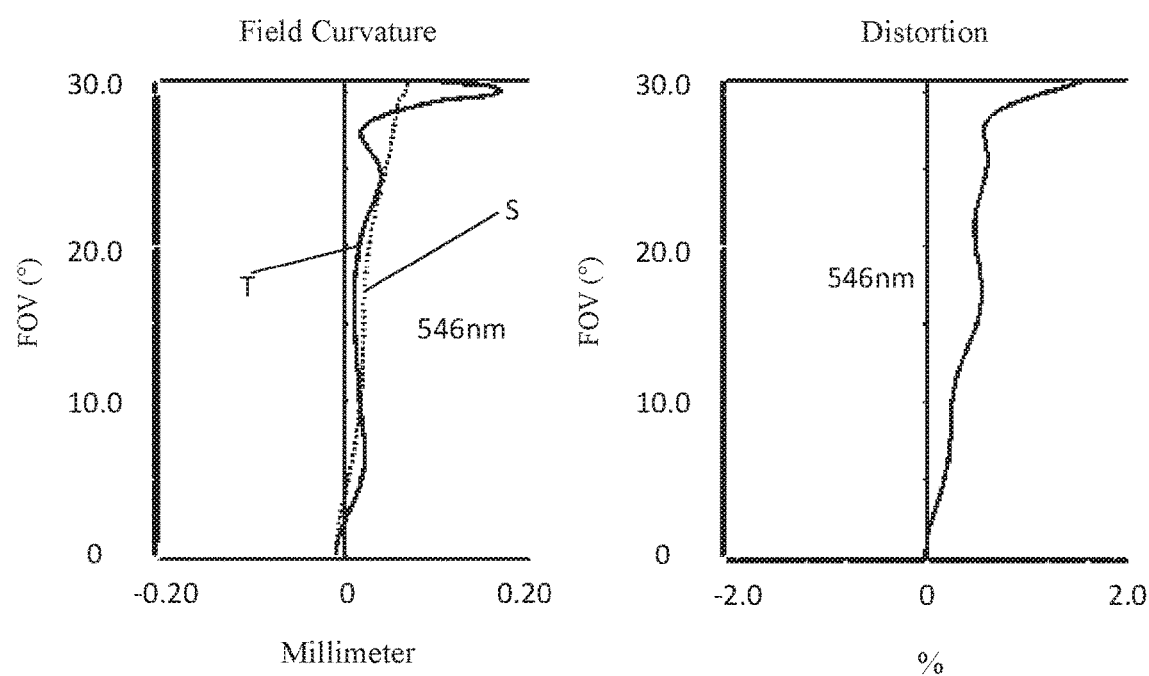
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 656 nm, 587 nm, 546 nm, 486 nm and 436 nm after passing the camera optical lens 30 according to Embodiment 3. FIG. 12 illustrates field curvature and distortion of light with a wavelength of 546 nm after passing the camera optical lens 30 according to Embodiment 3.

Table 13 below further lists various values of the present embodiment and values corresponding to parameters which are specified in the above conditions. Obviously, the camera optical lens according to this embodiment satisfies the above conditions.

In this embodiment, the entrance pupil diameter of the camera optical lens is 1.102 mm. The image height of 1.0H is 2.90 mm. The FOV (field of view) is 60.00°. Thus, the camera optical lens can achieve ultra-thin, wide-angle lenses while having on-axis and off-axis aberrations sufficiently corrected, thereby leading to better optical characteristics.

TABLE 13

| Parameters and Conditions | Embodiment 1 | Embodiment 2 | Embodiment 3 |
|---|---|---|---|
| f1/f | 1.94 | 2.99 | 3.19 |
| f2 | −180.93 | −4.02 | −199.81 |
| n4 | 1.57 | 1.67 | 1.67 |
| f | 3.152 | 1.430 | 2.095 |
| f1 | 6.116 | 4.271 | 6.692 |
| f3 | 7.575 | 6.659 | 8.295 |
| f4 | 95.757 | 1.685 | 2.939 |
| f5 | 24.898 | 81.046 | 95.908 |
| f6 | −11.687 | −7.445 | −6.486 |
| f7 | 3.614 | 3.914 | 6.442 |
| f8 | −2.548 | −3.597 | −3.766 |
| f12 | 5.850 | 27.870 | 6.181 |
| Fno | 1.900 | 1.899 | 1.901 |

Fno denotes an F number of the camera optical lens.

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:

1. A camera optical lens, comprising, from an object side to an image side:
    a first lens;
    a second lens;
    a third lens;
    a fourth lens;
    a fifth lens;
    a sixth lens;
    a seventh lens; and
    an eighth lens,
    wherein the camera optical lens satisfies following conditions:

$1.92 \leq f1/f \leq 3.20$;

$f2 \leq 0.00$;

$1.55 \leq n4 \leq 1.70$, $-5.03 \leq f8/f \leq -0.54$ $0.02 \leq d15/TTL \leq 0.11$; and $0.53 \leq (R15+R16)/(R15-R16) \leq 2.10$, Where
    f denotes a focal length of the camera optical lens;
    f1 denotes a focal length of the first lens;
    f2 denotes a focal length of the second lens;
    n4 denotes a refractive index of the fourth lens;
    f8 denotes a focal length of the eighth lens;
    R15 denotes a curvature radius of an object side surface of the eighth lens;
    R16 denotes a curvature radius of an image side surface of the eighth lens;
    d15 denotes an on-axis thickness of the eighth lens; and
    TTL denotes a total optical length from an object side surface of the first lens to an image plane of the camera optical lens along an optic axis.

2. The camera optical lens as described in claim 1, further satisfying a following condition:

$$0.04 \leq d12/d13 \leq 0.35,$$

Where
d12 denotes an on-axis distance from an image side surface of the sixth lens to an object side surface of the seventh lens; and
d13 denotes an on-axis thickness of the seventh lens.

3. The camera optical lens as described in claim 1, further satisfying a following condition:

$$2.00 \leq (R3+R4)/(R3-R4) \leq 23.00,$$

Where
R3 denotes a curvature radius of an object side surface of the second lens; and
R4 denotes a curvature radius of an image side surface of the second lens.

4. The camera optical lens as described in claim 1, further satisfying following conditions:

$$-7.01 \leq (R1+R2)/(R1-R2) \leq -1.25; \text{ and}$$

$$0.04 \leq d1/TTL \leq 0.14,$$

Where
R1 denotes a curvature radius of an object side surface of the first lens;
R2 denotes a curvature radius of an image side surface of the first lens;
d1 denotes an on-axis thickness of the first lens.

5. The camera optical lens as described in claim 1, further satisfying following conditions:

$$-190.75 \leq f2/f \leq -1.88; \text{ and}$$

$$0.03 \leq d3/TTL \leq 0.13,$$

Where
d3 denotes an on-axis thickness of the second lens.

6. The camera optical lens as described in claim 1, further satisfying following conditions:

$$1.20 \leq f3/f \leq 6.98;$$

$$-0.56 \leq (R5+R6)/(R5-R6) \leq -0.05; \text{ and}$$

$$0.03 \leq d5/TTL \leq 0.12,$$

Where
f3 denotes a focal length of the third lens;
R5 denotes a curvature radius of an object side surface of the third lens;
R6 denotes a curvature radius of an image side surface of the third lens;
d5 denotes an on-axis thickness of the third lens.

7. The camera optical lens as described in claim 1, further satisfying following conditions:

$$0.59 \leq f4/f \leq 45.57;$$

$$-1.63 \leq (R7+R8)/(R7-R8) \leq 9.23; \text{ and}$$

$$0.02 \leq d7/TTL \leq 0.06,$$

Where
f4 denotes a focal length of the fourth lens;
R7 denotes a curvature radius of an object side surface of the fourth lens;
R8 denotes a curvature radius of an image side surface of the fourth lens;
d7 denotes an on-axis thickness of the fourth lens.

8. The camera optical lens as described in claim 1, further satisfying following conditions:

$$3.95 \leq f5/f \leq 85.01;$$

$$0.87 \leq (R9+R10)/(R9-R10) \leq 15.84; \text{ and}$$

$$0.01 \leq d9/TTL \leq 0.07,$$

Where
f5 denotes a focal length of the fifth lens;
R9 denotes a curvature radius of an object side surface of the fifth lens;
R10 denotes a curvature radius of an image side surface of the fifth lens;
d9 denotes an on-axis thickness of the fifth lens.

9. The camera optical lens as described in claim 1, further satisfying following conditions:

$$-10.41 \leq f6/f \leq -2.06;$$

$$-11.31 \leq (R11+R12)/(R11-R12) \leq -1.79; \text{ and}$$

$$0.02 \leq d11/TTL \leq 0.17,$$

Where
f6 denotes a focal length of the sixth lens;
R11 denotes a curvature radius of an object side surface of the sixth lens;
R12 denotes a curvature radius of an image side surface of the sixth lens;
d11 denotes an on-axis thickness of the sixth lens.

10. The camera optical lens as described in claim 1, further satisfying following conditions:

$$0.57 \leq f7/f \leq 4.61;$$

$$-1.72 \leq (R13+R14)/(R13-R14) \leq -0.21; \text{ and}$$

$$0.05 \leq d13/TTL \leq 0.27,$$

Where
f7 denotes a focal length of the seventh lens;
R13 denotes a curvature radius of an object side surface of the seventh lens;
R14 denotes a curvature radius of an image side surface of the seventh lens;
d13 denotes an on-axis thickness of the seventh lens.

* * * * *